(12) United States Patent
Baller (10) Patent No.: US 8,346,679 B2
(45) Date of Patent: Jan. 1, 2013

(54) MODULAR GEOTHERMAL MEASUREMENT SYSTEM

(75) Inventor: Eric Henry Baller, Webster, NY (US)

(73) Assignee: Energywise Partners LLC, Rochester, NY (US)

( * ) Notice: Subject to any disclaimer, the term of this patent is extended or adjusted under 35 U.S.C. 154(b) by 191 days.

(21) Appl. No.: 12/714,988

(22) Filed: Mar. 1, 2010

(65) Prior Publication Data

US 2010/0223171 A1 Sep. 2, 2010

Related U.S. Application Data

(60) Provisional application No. 61/156,646, filed on Mar. 2, 2009.

(51) Int. Cl.
 *G06F 17/00* (2006.01)
 *G07F 19/00* (2006.01)
(52) U.S. Cl. .......................................... 705/412; 705/34
(58) Field of Classification Search .................. 705/400, 705/412, 34, 1.1, 26.1–26.9, 28–30, 39, 40, 705/7.12, 7.13; 165/45; 60/641.1–641.5; 700/300, 295
See application file for complete search history.

(56) References Cited

U.S. PATENT DOCUMENTS

| | | | |
|---|---|---|---|
| 4,049,044 A | 9/1977 | Cohen | |
| 4,054,176 A * | 10/1977 | Van Huisen | 165/45 |
| 4,091,636 A | 5/1978 | Margen | |
| 4,306,293 A | 12/1981 | Marathe | |
| 4,646,538 A | 3/1987 | Blackshaw et al. | |
| 4,920,757 A | 5/1990 | Gazes et al. | |
| 5,239,838 A | 8/1993 | Tressler | |
| 5,461,876 A | 10/1995 | Dressler | |
| 5,992,507 A | 11/1999 | Peterson et al. | |
| 6,154,730 A * | 11/2000 | Adams et al. | 705/36 R |
| 6,585,036 B2 | 7/2003 | Amerman et al. | |
| 6,694,766 B1 | 2/2004 | Johnson, Jr. et al. | |
| 2003/0024685 A1* | 2/2003 | Ace | 165/45 |
| 2004/0181436 A1* | 9/2004 | Lange | 705/4 |
| 2005/0278200 A1* | 12/2005 | Brawley et al. | 705/4 |
| 2007/0151704 A1* | 7/2007 | Elmore | 165/45 |
| 2008/0270276 A1* | 10/2008 | Herzig | 705/35 |
| 2009/0157565 A1* | 6/2009 | Breck | 705/36 T |
| 2009/0177548 A1* | 7/2009 | Eisenlohr | 705/14 |
| 2009/0299537 A1* | 12/2009 | Rea et al. | 700/286 |

* cited by examiner

*Primary Examiner* — Igor Borissov
(74) *Attorney, Agent, or Firm* — Patent Technologies, LLC; Robert D. Gunderman, Jr.

(57) ABSTRACT

A modular geothermal measurement system that provides for the pumping of a heat transfer fluid. The modular unit simplifies on-site installation time by reducing the number of distinct components to be installed and allows for the optional incorporating of additional heat sources or sinks, whereby the length of ground loop can be reduced, further reducing installation costs. The modular measurement system further allows for the growth of the system over time by adding modules, increasing the ground loop pumping power while providing energy transfer data specific to each thermal load. A controller having an energy control module provides energy control points. Such a system allows the beneficiary of a geothermal investment to be billed for their benefit, enabling the investor to capture the economic benefit of the investment.

5 Claims, 7 Drawing Sheets

MODULAR GEOTHERMAL MEASUREMENT SYSTEM

This application claims priority to U.S. Patent Application Ser. No. 61/156,646 filed Mar. 2, 2009 entitled "Modular Geothermal Measurement System" by Eric Henry Baller of Webster, N.Y., U.S.A.

BACKGROUND OF THE INVENTION

1. Field of the Invention

This application relates generally to heating and cooling apparatus, and more particularly to a heating and cooling system having a heat transfer mechanism.

2. Description of Related Art

With the steadily increasing costs of fossil and other depletable types of fuels, which are presently being used to obtain desirable temperature levels in environmental and process loads, greater emphasis is being directed toward developing systems and methods to extract energy from the vast, virtually unlimited thermal energy stored in the earth and transferring that energy to loads for heating purposes and, reversely, extracting thermal energy from the loads and transferring that energy to the earth for dissipation therein for cooling purposes. One type of previous mechanism for accomplishing such heat exchange objectives is commonly referred to as a heat pump.

Conventional air-source reverse-cycle heat pump systems are commonly used for providing heating and/or cooling to building environmental spaces, manufacturing processes, and a variety of other uses. Properly used, such systems can be quite effective in environments where the ambient temperature is not extreme. Although generally acceptable performance is obtained in such moderate ambient temperature conditions, such systems leave a lot to be desired during extreme fluctuations in ambient temperatures, wherein substantial reductions in heating and cooling capabilities and in operating efficiencies are seen.

In recent years, heat-pump systems have been developed which use ground-source heat exchangers whereby the earth is utilized as a heat source and/or sink, as appropriate. Heat-pump systems utilizing the more moderate temperature range of the earth provide efficiencies which are substantially improved over those obtained from air-source heat pump systems. Such earth exchange systems are based on the concept that useful thermal energy could be transferred to and from the earth by the use of subterranean tubes in flow communication with various above ground components.

In a direct exchange ground loop system, refrigerant coolant pumped through such tubes by a compressor serves as a carrier to convey thermal energy absorbed from the earth, as a heat source, to the above ground components for further distribution as desired for heating purposes. Similarly, the coolant carries thermal energy from the above ground components through the subterranean tubes for dissipation of heat energy into the earth, as a heat sink, for cooling purposes.

Unfortunately, a number of major complications may arise when refrigerant is pumped through the subterranean tubes. First, lubricant oil which characteristically escapes from the compressor while the system is operating is carried along with the refrigerant throughout the system and tends to accumulate in the tubes, substantially reducing the ability of the subterranean tubes to perform their originally intended function. Second, when an energy demand cycle is completed, the system would shut down while waiting for a subsequent demand for energy transfer. As a result, a certain amount of liquid refrigerant then passing through the subterranean tubes would lose its momentum and revert to liquid, leading to low pressure fault conditions. A third problem, which was generally observed for prior art heat pumps, was the absence of a mechanism for achieving refrigerant pressure equalization subsequent to system shutdown for reducing start-up loads. Because of the absence of such pressure equalization, the service life of the compressor was reduced.

Previous attempts to circumvent some of the aforesaid problems generally followed either of two approaches: (i) using a vertically disposed, single-closed loop, subterranean exchanger, or (ii) using a plurality of closed loop systems working in combination, with one of such loops horizontally or vertically disposed subterraneously.

According to Amerman et al in U.S. Pat. No. 6,585,036. "Several companies in the past have produced "energy meters" that calculate and record energy extracted from a circulating water loop and bill the customer for the energy used. This has been done for many years in "district heating" applications in Europe. Such equipment only records heat flow in one direction—usually heat extracted from the flow stream, not heat rejected into the flow stream as would be the case in a heat pump in a cooling mode (air conditioning operation)". Further, Amerman et al. in U.S. Pat. No. 6,585,036 extended such metering to direct exchange ground loop systems by incorporating measurement devices directly in the heat pump's flow. Such direct exchange loops, however, are not practical for complex installations because temperature gradients in various elements of the system can lead to vapor locks or condensation within the loop, as previously discussed.

The concept of individual unit monitoring with individually tailored systems is shown for a hot air system in U.S. Pat. No. 4,049,044 wherein each separate blower unit that distributes the conditioned air throughout the individual units is coupled to drive a related integrating means to produce a readout in accordance with the fan usage. For example, in Europe, heat responsive metering units which are hung directly on the heat exchanges are widely employed for monitoring and recording of the actual energy usage based on the hot water flowing through a radiator. Such systems are widely accepted, with various countries providing legal regulation of their usage. Generally, it has been found that the residents' incentive is such as to substantially reduce their usage of energy and studies have indicated that the reduction may be on the order of 30%. The current focus on reducing energy usage and corresponding carbon emissions thus indicates that individual metering of energy consumption in multiple unit complexes is a highly desirable social factor as well as an advantage to the individual residents to insure that they are being burdened with only those costs related to their actual consumption. Both the invention disclosed in U.S. Pat. No. 4,049,044 and the radiator systems of Europe, however, depend on measuring heat output, as opposed to measuring energy input. Measuring only heat output does not allow for accurate measurement of each energy input, such as electricity from the local utility and thermal energy from the ground loop and thus cannot be used to effectively allocate costs.

Marathe et. al. in U.S. Pat. No. 4,306,293 attempted to address this issue by measuring the flow rate from the energy source and inferring the energy flow to individual units. Through pre-programmed weightings this approach could compensate for variations in flow rates through different loads, but such one-time weighting, factors are subject to changes in specific conditions over time. In addition, each embodiment relied on a pre-determined system configuration that did not vary. There was no flexibility for growth or change to the system over time nor dynamic adjustment of the pumping source to changing load patterns, leading to inefficiencies since no means are provided to vary the pumping rate depending on load. These limitations reduce efficiency through improper pumping pressures and lead to a loss of accuracy, particularly over time as actual conditions drift from initial system weighting calculations. Low accuracy prevents such systems from being reliably used in situations where accuracy is important, such as allocation of costs to individual loads, as may be found in multi-unit residential and commercial buildings.

Another attempt was made in U.S. Pat. No. 5,992,507 by Peterson, et. al, to manage a plurality of heating loads, but this system required a purging manhole in direct fluid communication with the input and output loop manifolds as well as an external pumping mechanism within each thermal load. Both of these requirements add significantly to system installation costs and impose additional costly requirements on each thermal load serviced by the system.

Despite improvements, a further disadvantage arising from prolonged usage of the earth-source heat-pump systems still remained: stressing of the earth's ability to transfer and/or store large quantities of thermal energy in the vicinity of the heat exchanger for extended periods of time. This situation was generally particularly noticeable for systems used for manufacturing processes or under-sized environmental space conditioning applications. A similar situation could also be seen in climates imbalanced in their annual heating or cooling needs, such as northern climates requiring substantially more heating than cooling over the course of a year or southern climates requiring the opposite.

An attempted solution to the stressing problem included the augmentation of a liquid-source heat pump with a liquid-heat exchanger loop which integrated both a liquid-based subterranean heat exchanger and a liquid-based fan coil in an attempt to boost the performance of the liquid-source heat pump, such as that taught by Margen in U.S. Pat. No. 4,091,636. In that system, only one or the other of the heat exchangers were operated at any one time. Unfortunately, such integrated systems generally failed to realize optimum operational efficiencies. Further, the integrated refrigerant and liquid subsystems produced a system with substantially increased complexity and maintenance requirements.

In another approach, such as that taught by Gazes et al. in U.S. Pat. No. 4,920,757, a third fan coil was integrated with a refrigerant-based subterranean heat pump design. That system, however, did not employ the additional fan coil as an alternative energy source. Instead, it merely used the coil to control excess refrigerant build-up in the subterranean heat exchanger; during one cycle, it worked serially with the indoor-heat exchanger and, during the other cycle, it worked serially with the subterranean heat exchanger.

In yet another approach, as taught by Tressler in U.S. Pat. No. 5,239,838, two separate heat exchange sources were incorporated into a single heat pump system. That system could either be operated as an air-source heat pump or as a liquid-source heat pump attached to a thermal storage tank, which was in turn heated by a water heater or solar panel. The system was designed to perform as an air-source heat pump or, during the heating cycle, to draw thermal energy from the storage tank. Again, that system did not realize optimum operational efficiencies because it did not coordinate concurrent utilization of both energy sources.

In still another approach, as taught by Blackshaw et al. in U.S. Pat. No. 4,646,538, a system incorporated three heat exchangers: a secondary liquid-based subterranean heat exchanger, an indoor fan coil heat exchanger, and a hot-liquid heat exchanger. Although the system could transfer heat between any two of the heat exchangers, the Blackshaw et al. system did not utilize the third heat exchanger to augment the performance of the subterranean heat exchange loop and optimum efficiencies were not fully realized.

In yet another combination, as taught by Dressler et al. in U.S. Pat. No. 5,461,876, a system provided a combination of a refrigerant-based subterranean heat exchanger in combination with an ambient-air exchanger. Although the system may boost efficiency in certain environmental conditions, it was still limited to an efficiency that essentially averaged the contribution of each source depending on existent ambient conditions.

Finally, Johnson and Tinkler in U.S. Pat. No. 6,694,766 showed a means of capturing waste heat or excess cooling capacity from an existing process but again did nothing to capture the benefit of additional heat source or sink gains that could be available through supplemental thermal systems.

What is required is an affordable mechanism of providing a comprehensive view of system performance. It is therefore an object of the present invention to provide a pumping and measurement system which modularly grows system capacity by adding additional pumping power with each additional load system, as well as directly measuring energy flowing through the module, providing a more accurate measure of energy consumed or produced. Higher accuracy allows for reliable cost allocation, particularly in multi-unit commercial and residential buildings. Furthermore, detailed visibility of system performance allows for substantial gains in efficiency by incorporating non-ambient heat sources/sinks as may be desirable to enhance performance. Higher efficiency further allows system designers and installers to reduce the heat transfer demand of the ground loop, reducing the still substantial cost of trenching, drilling or otherwise installing the earth heat transfer system.

The present invention and the various embodiments described and envisioned herein provides a modular geothermal measurement system that provides for the pumping of a heat transfer fluid and that simplifies on-site installation time, allows for growth of the system over time, increases ground loop pumping power while providing energy transfer data specific to each thermal load, and allows the beneficiary of a geothermal investment to be billed for their benefit, enabling the investor to capture the economic benefit of the investment.

It is, therefore, an object of at least certain embodiments of the present invention to provide new, useful, unique, efficient, nonobvious systems and methods for providing energy to an end user from a ground energy transfer system and, in one aspect, from an energy transfer loop system. Such systems and methods include metering and quantifying energy delivery for use in various later calculations and transactions. Such systems and methods further include measuring energy transfer for each of a variety of heating or cooling loads for use in later calculations and transactions. It is another object of the present invention to provide new, useful, unique, efficient, nonobvious systems and methods for combining heating and cooling sources to improve overall system performance. It is another object of the present invention to provide new systems and methods for measuring Carbon Dioxide reduction to communicate the social or economic benefits of such reduction.

BRIEF SUMMARY OF THE INVENTION

In accordance with the present invention, there is provided a modular geothermal measurement system comprising a ground source central module having a pump in fluid communication with a geothermal ground loop; the ground source central module further having a pump in fluid communication with a heat exchanger; a temperature sensor in thermal communication with the geothermal ground loop before the heat exchanger; a temperature sensor in thermal communication with the geothermal ground loop after the heat exchanger; a controller, having a processor and memory, electrically coupled to said temperature sensor; and an energy control module stored in said memory for providing energy control points.

The foregoing paragraph has been provided by way of introduction, and is not intended to limit the scope of the invention as described by this specification, claims, and the attached drawings.

BRIEF DESCRIPTION OF THE DRAWINGS

The invention will be described by reference to the following drawings, in which like numerals refer to like elements, and in which.

The present invention will be described in connection with several preferred embodiments, however, it will be understood that there is no intent to limit the invention to the embodiments described. On the contrary, the intent is to cover all alternatives, modifications, and equivalents as may be included within the spirit and scope of the invention as defined by this specification, claims, and the attached drawings.

DESCRIPTION OF THE PREFERRED EMBODIMENTS

The problems encountered in the related art are overcome by the present invention which provides a modular pumping and measurement system. The pumping mechanism can be used to circulate heat transfer fluid for example, but not limited to, a geothermal heat exchanger with the fluid circulating under ground through horizontal or vertical bore loops or any of a variety of fluid reservoirs designed to exchange heat with the ground or store heat energy.

In one embodiment of the present invention, the system is part of a closed pressurized circuit, but other embodiments may include an open system (such as, but not limited to using an aquifer as the fluid source and drain) and an ambient pressure system which has advantages in certain situations, such as where anti-freeze fluid may need to be introduced in the loop after initial commissioning.

The system also allows for the combination of energy sources, a result which can provide significant improvements in system efficiency. These improvements are especially important when one of the pumping mechanisms is tied to a ground loop system, since improved overall system performance will reduce the thermal demand on the ground loop and can be used to reduce the required ground bore depth, trench length or other ground excavation activity.

In one embodiment of the present invention, such combination of energy sources can be used, for example, to introduce heat from a solar thermal circuit into the geothermal exchange loop. This could include, for example, cooling towers, solar thermal collectors, co-generation facilities and other means of capturing environmental or "waste" energy.

In the case where the heat exchanger is a heat pump, a solar-thermal boost to a ground loop system provides an increase in the entering water temperature (EWT) of the heat pump, which leads to a direct improvement in system heating efficiency (as measured by the Coefficient of Performance—COP—of the heat pump).

In cooling seasons, raising the EWT may be counter-productive, so solar thermal energy can be instead diverted to heating Domestic Hot Water (DHW). This has the added benefit of using solar energy most efficiently during each season. That is, using the relatively hot summer temperatures of the solar thermal loop to heat DHW (which requires high temperatures) and the relatively cool winter temperatures of the solar thermal loop to to heat the ground loop (which can benefit from even modest increases in EWT). Use of solar thermal energy in the winter is typically far from sufficient for DHW use, especially in cool climates.

It is possible, however, to provide some amount of seasonal energy storage in a ground loop, especially if designed with significant thermal mass. In some situations, this may be desired over DHW production.

In one embodiment, the system includes a collection of valves that are selectively adjustable to route thermal energy between any two of the heat exchangers (i.e., DHW and Ground Loop).

In one embodiment of the present invention, a plurality of ground loops are used and separately controlled. Control of such an arrangement may include, for example, the use of a solenoid valve in fluid communication with said geothermal ground loop and electrically coupled to a controller, such as the controller illustrated in FIG. 1. Such an embodiment eliminates the need to bury manifolds to combine multiple loops or bores into a single ground source pumping system.

In one embodiment of the present invention, calculations are performed on the temperature and flow information to determine energy usage. This energy usage information is made available for display, through a local display or through connected web pages. In one embodiment of the present invention, further calculations are performed on energy usage to allocate energy usage to individual units. In one embodiment of the present invention, allocated energy usage is further calculated to allocate energy costs to the unit, which are then made available for display or billing.

The present invention provides a modular pumping and measurement system that provides a high level of adaptability and improved efficiency over conventional systems. The control system permits selective operation of any elements in combination, thereby providing a highly adaptable system that can be controlled to take advantage of the most efficient heating or cooling sources, heat exchange mechanisms, and combinations for varying circumstances. Additionally, the unique circuit of the present invention provides for the optional addition or removal of thermal energy, providing for higher system efficiency. The circuit of the present invention is easily implemented with a small number of relatively inexpensive components. Accordingly, the equipment and installation costs of the system are relatively low.

For a general understanding of the present invention, reference is made to the drawings. In the drawings, like reference numerals have been used throughout to designate identical elements.

Figure 1:
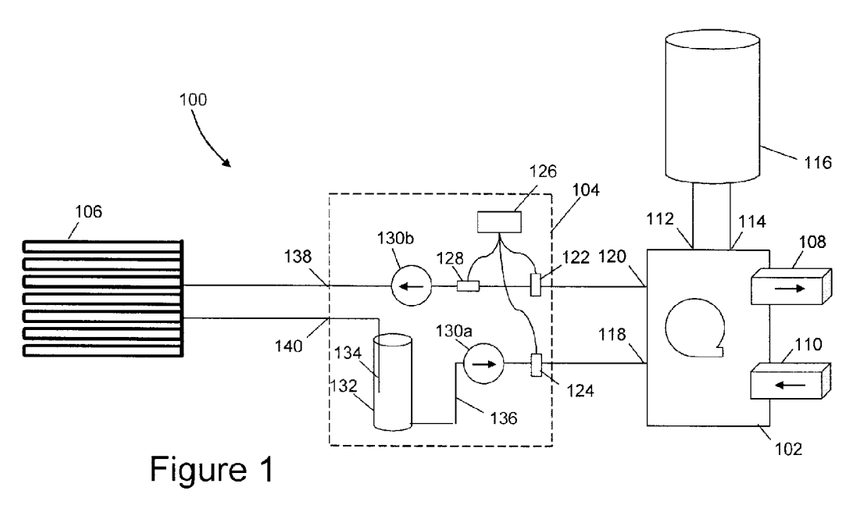
FIG. 1 is a schematic diagram of a heat pump circuit having a modular geothermal measurement system.

Referring now to the invention in more detail, in FIG. 1 there is shown a heating and cooling system 100 having a modular geothermal measurement system. The system 100 generally includes a heat pump 102 providing heat exchange, a ground source central module 104 and a ground loop 106. The ground source central module 104 being a subsystem that has a pump in fluid communication with the geothermal ground loop, and further having a pump in fluid communication with a heat pump, either of which may be optional in certain circumstances. The heat pump 102 may be any of a variety of commercial heat pumps, many of which are used to provide heated air or water to condition inside space. FIG. 1 shows an example that provides heated air through duct 108 and return duct 110. In other embodiments of the invention, the air ducts 108 and 110 may be replaced by a radiant heating system or by any combination of commonly used means of distributing heat to an environment or a process load. Some models of heat pump 102 provide an optional desuperheater output 112 and return 114 for heating of Domestic Hot Water (DHW), typically stored in DHW tank 116.

Continuing with the illustration of FIG. 1, the heat pump 102 has a liquid inlet 118 and liquid outlet 120. The liquid outlet 120 is connected to the ground loop 106 through the ground source central module 104. In the specific embodiment illustrated, the ground loop 106 consists of a single loop. Other embodiments may include a set of multiple loops connected through a manifold system to the central module 104.

Figure 6:
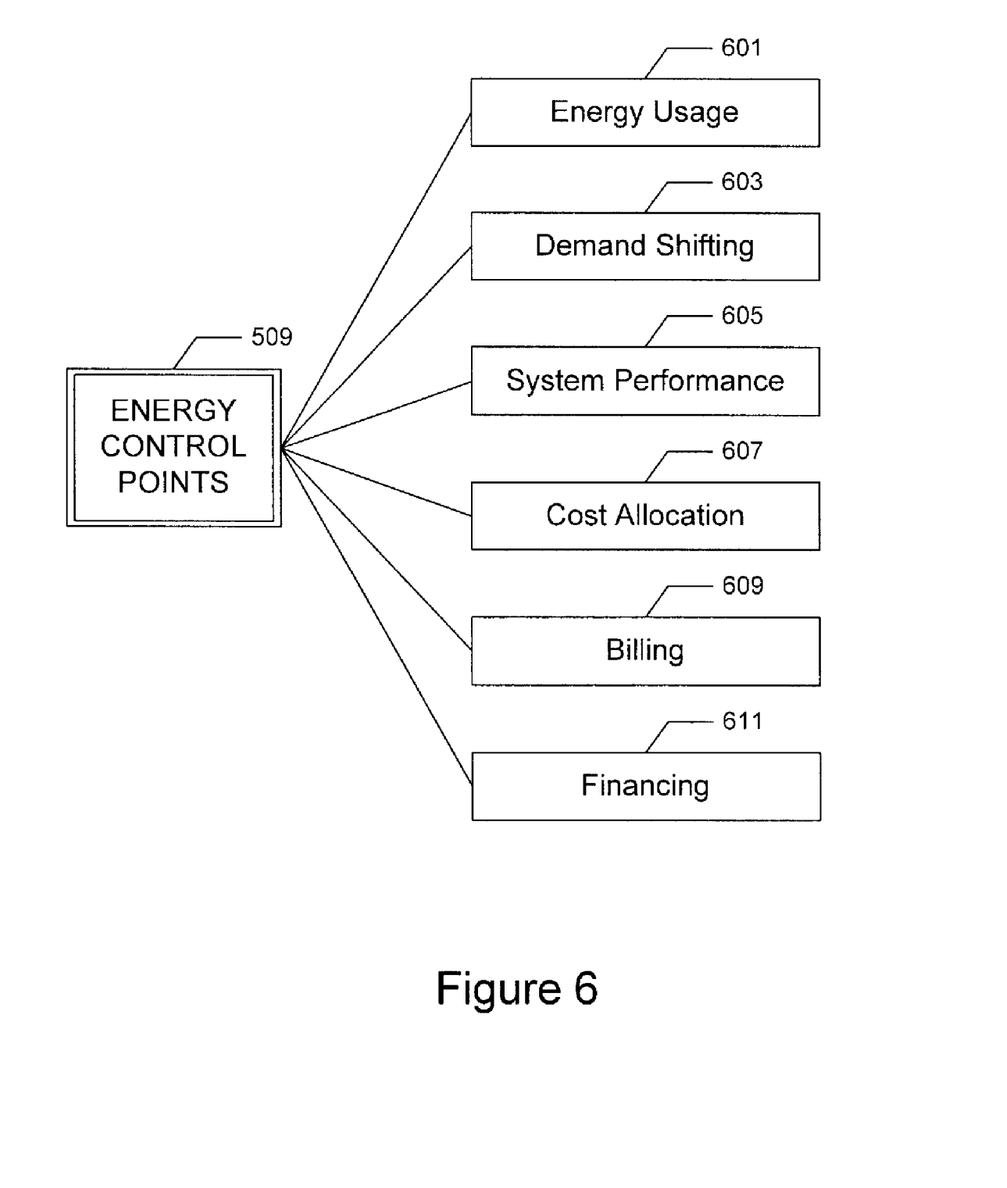
FIG. 6 illustrates various exemplary energy control points.

Between the heat pump 102 and ground loop 106, a temperature sensor 122 measures the temperature of the liquid flowing out of the heat pump 102. A similar temperature sensor 124 measures the temperature of the liquid flowing into the heat pump 102. Data from the sensors 122 and 124 are transmitted to controller 126. The controller has a processor and memory and is electrically coupled to the temperature sensor. Contained within the memory of the controller is an energy control module that provides energy control points. The energy control module comprises a program that provides energy control points where the energy control points are a useful output of the energy control module. The energy control points are depicted in FIG. 6, and include, but are not limited to, energy usage information, demand shilling information and control, system performance information, cost allocation information, billing information, financing information, and the like. The energy control module may, in some embodiments of the present invention, have a server such as a computer operatively coupled to said energy control module.

The controller 126 is also connected to a device for measuring the volume of fluid flow. In the particular embodiment illustrated in FIG. 1, this is measured by flow meter 128. In other embodiments the flow could be measured through other means, for example, through measurement of pressure drop across a known length of pipe or other known fluid element, or other means of calculation of flow volume.

In some specific cases, flow rate is constant, depending only on whether the pumps are operating or not, in which case an initial flow rate measurement, even manual, may be observed and stored within the energy control module.

To induce the flow of liquid through the heat pump and the ground loop, a set of one or more pumps 130a and 130b are used. In various embodiments only one pump may be necessary and in other embodiments more than two may be required to sufficiently pump a heat transfer fluid through the loop 106. In the current view, two similar pumps 130a and 130b are used to push and pull heat transfer fluid through heat pump 102 and ground loop 106. The ground loop 106 may, in certain embodiments, be connected through a module outlet port 138 and inlet port 140. The ground loop consisting of a horizontal field of pipes, a set of vertical bores or a combination of one or more vessels used to absorb heat from the earth as the fluid is circulated.

In some embodiments, the fluid may also flow through a vessel 132 including an inlet pipe 134 and outlet 136 through which fluid flows, both the inlet 134 and outlet 136 remaining beneath the level of fluid in vessel 132. In other embodiments, the system is closed and pressurized.

The controller 126 calculates energy usage through monitoring of fluid flow and temperature differentials. In one embodiment, the calculation resolves to units of energy measured in British Thermal Units (BTUs) for comparison to the equivalent heat energy of natural gas, oil, electricity or other fuel source.

The controller 126 may optionally connect to a local display to provide a local readout of system data or energy flow. In another embodiment, the controller 126 is connected through wired or wireless means to a computing system, located within the building or remotely, for further calculation, data storage or user access.

Figure 2:
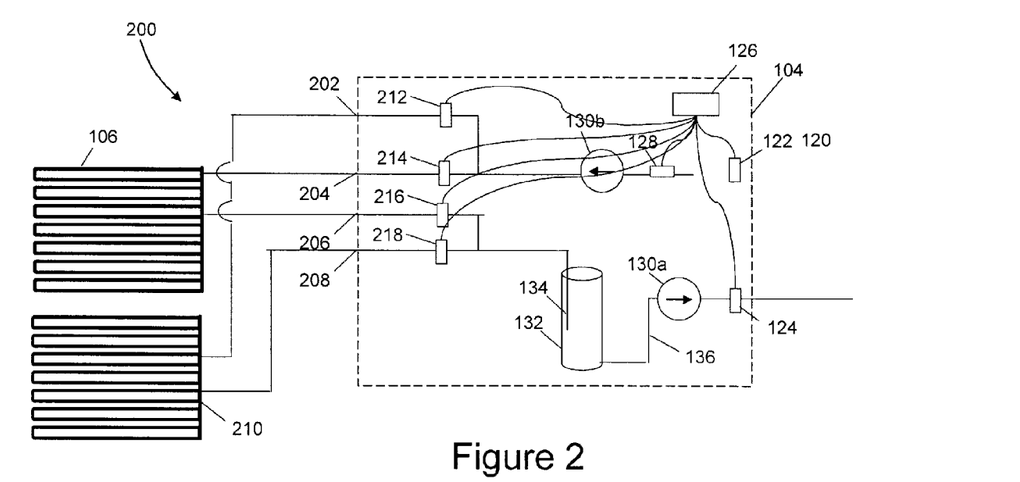
FIG. 2 is a schematic diagram of a pump module in a heat pump circuit having a modular geothermal measurement system utilizing two heat sources.

FIG. 2 shows an alternate embodiment of the invention. Heating and cooling system 200 consists of a subset of components similar to the embodiment shown in FIG. 1 with the central module 104 connected to two ground loops 106 and 210. Each ground loop is connected through corresponding inlet and outlet ports—ground loop 106 connected to outlet port 204 of central module 104. Ground loop 210 is connected to outlet port 202 of central module 104. Inlet ports 206 and 208 are connected to ground loops 106 and 210 respectively.

The temperature of fluids leaving outlet ports 202 and 204 are measured by temperature sensors 212 and 214, respectively. The temperature of fluid returning from ground loop 106 and 210 through inlet ports 206 and 208 are measured by temperature sensors 216 and 218, respectively. Measurement of individual ground loop outlet and inlet temperatures allows for calculation of ground loop effectiveness. In another embodiment, flow through each ground loop 106 and 210 is further controlled by solenoids located near the corresponding inlet and outlet ports, such solenoids being controlled by controller 126 and having the effect of allowing or preventing the flow of fluid into and out of each ground loop. In an alternate embodiment, manual valves are provided to allow manual control of loop usage. Additional embodiments may include additional ground loops.

Figure 3:
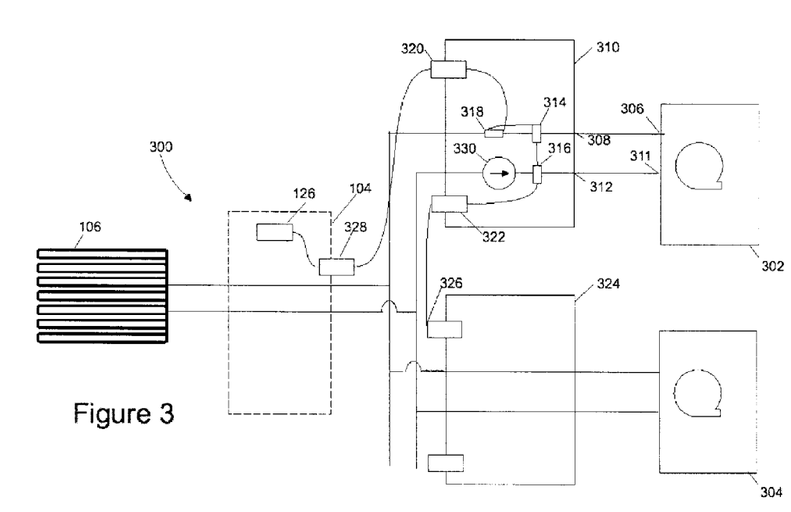
FIG. 3 is a schematic diagram of a pump module in a heat pump circuit having a modular geothermal measurement system as applied to two independent loads.

FIG. 3 shows a further embodiment of the invention in which the monitoring element is modularized for ease of installation and accurate measurement at each of several loads. In the embodiment illustrated in FIG. 3, the heating and cooling system 300 now has a ground loop 106, central module 104 and a set of two heat pumps 302 and 304. Alternative embodiments may include one or more heat pumps with or without attached Domestic Hot Water desuperheaters.

Looking specifically at heat pump 302 of FIG. 3, heat pump 302 has outlet port 306 connected to the inlet port 308 of pump module 310. Similarly, heat pump inlet port 311 is connected to outlet port 312 of pump module 310. The temperature of fluid flowing through inlet port 308 and outlet port 312 of heat pump module 310 are measured by temperature sensors 314 and 316 respectively. Fluid flow is measured through a flow meter 318 or, in alternate embodiments through a combination of pressure sensors or other means of measuring fluid flow. The various sensors 314, 316 and 318 are connected together and to a modular data connector 320.

In one embodiment, the sensors are "1-wire" sensors and the connector 320 is an RJ-45 jack.

In the illustrated embodiment of FIG. 3, a second data connector 322 is also connected to the internal sensors, allowing for a continuous string of serially connected sensors. In this way, a second heat pump 304 may be connected through pump module 324 with modular data connector 326 in a serial fashion. FIG. 3 further illustrates the embodiment of the modular pumping system that consists of an electronic connection from data jack 320 to a data jack 328 on the central module 104. By further connecting the data connector 328 to the controller 126, a full range of sensor data may be provided to the one central controller 126. In one embodiment, such a serial string of sensors is accomplished through a "1-wire" network.

The embodiment of FIG. 3 may be extended, adding additional pump modules for each load. In one embodiment, the central module 104 does not require any pump as the pumping pressure is provided by each pumping module, shown in FIG. 3 with pumping modules 310 and 324, pumping module 310 shown to include pump 330. In another embodiment, pumping is provided centrally without the need for the pumping module 310 to include pump 330.

In a further embodiment, the data jack 320 is replaced by a wired or wire-less connection, which may require a controller to condition or process the sensor data before sending.

Figure 4:
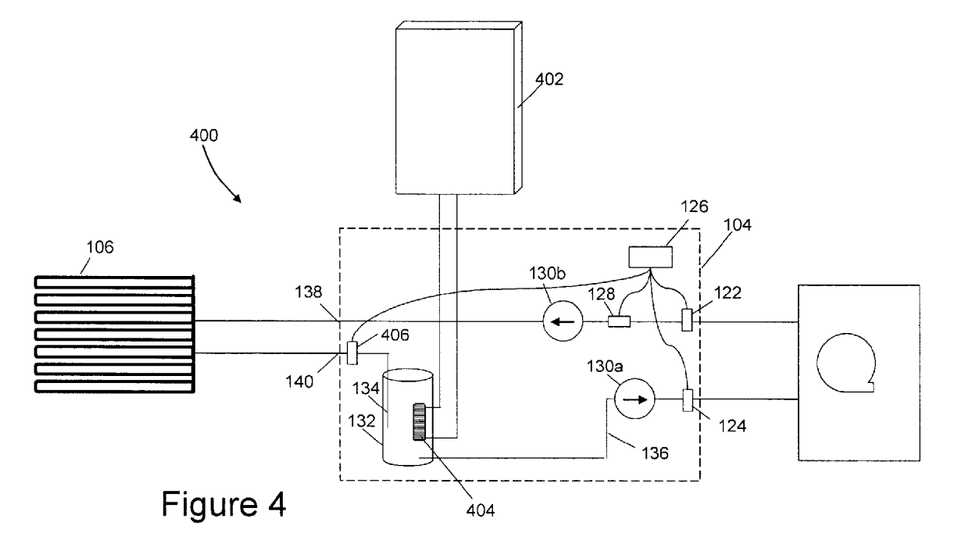
FIG. 4 is a schematic diagram of an embodiment of a pump module in a heat pump circuit having a modular geothermal measurement system incorporating an additional heat source.

FIG. 4 shows a further embodiment of the invention incorporating a supplemental heat source or sink. In the illustration of FIG. 4, one embodiment incorporates a solar thermal panel 402 providing solar thermal energy. Energy is transferred through a loop to the vessel 132 via a heat transfer coil 404 immersed in the fluid of the vessel 132. Alternative embodiments of the invention incorporate alternative means of transferring heat energy including coaxial coils, transfer to the pipes instead of the vessel or other thermal conduction means. In an embodiment of the invention more suitable for warm climates the solar panel 402 may be replaced by a chiller or other mechanism of exhausting excess heat.

Combinations of any number of energy sources, including ground and solar loops, and energy loads, such as heat pumps, can be combined in various embodiments of this invention. Materials and dimensions being known to one skilled in the art of ground source heat pumps.

Some advantages of the present invention include, but are not limited to, the ability to combine multiple heat sources and sinks in a modular fashion, in some embodiments further enabling modular growth of the system while providing accurate, economical measurement of energy flow sufficient for billing.

Figure 5:
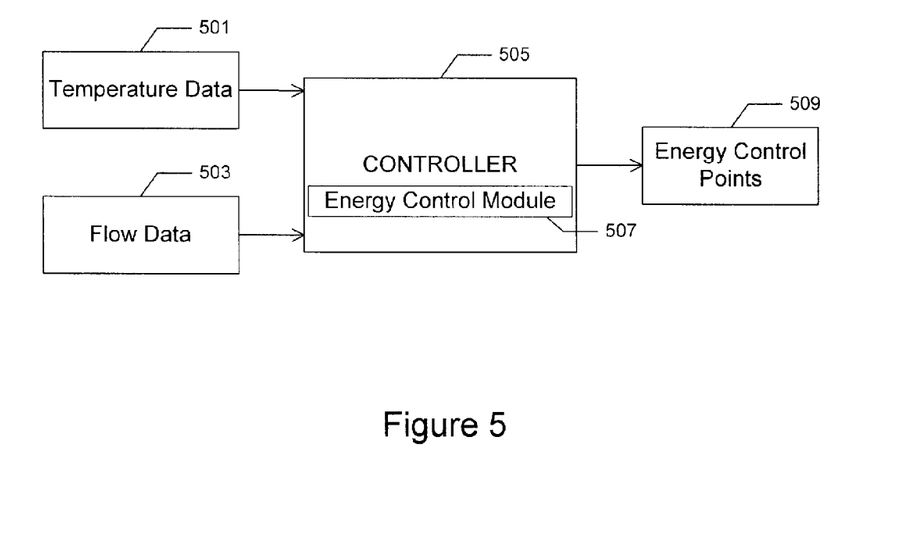
FIG. 5 is an input output diagram of the controller of the present invention.

The resulting measure of energy transferred to or from the load can be used to bill the beneficiary of the energy supplied. In addition or alternatively, the measure can be used to calculate an amount of energy usage avoided or a level of Carbon Dioxide avoided compared to traditional heating methods. Comparisons to other users of similar systems can also be used to compare relative performance, assisting in determining an appropriate level of service to maintain the system at peak operating efficiency. The controller of the present invention has an Energy Control Module that takes inputs such as temperature and flow data and provides useful output in the form of energy control points to accomplish the aforementioned objectives among others. FIG. 5 is an input output diagram of the controller of the present invention. The controller, having been previously described, comprises a processor and memory and is electrically coupled to sensors such as temperature sensors. The controller 505 comprises an energy control module 507 which is stored in memory and provides energy control points 509. The controller 505 takes in temperature data 501 by way of temperature sensors, flow data 503 by way of flow meters, and other input data that may provide for energy control points 509. The energy control points 509 are a useful output that may be provided by way of a display, monitor, hard copy report, data that is transferred to another computer or computer network, and the like. FIG. 6 illustrates various exemplary energy control points 509. Such energy control points include, but are not limited to, energy usage information, demand shifting information and control, system performance information, cost allocation information, billing information, financing information, and the like. The energy control module may, in some embodiments of the present invention, have a server such as a computer operatively coupled to said energy control module.

Figure 7:
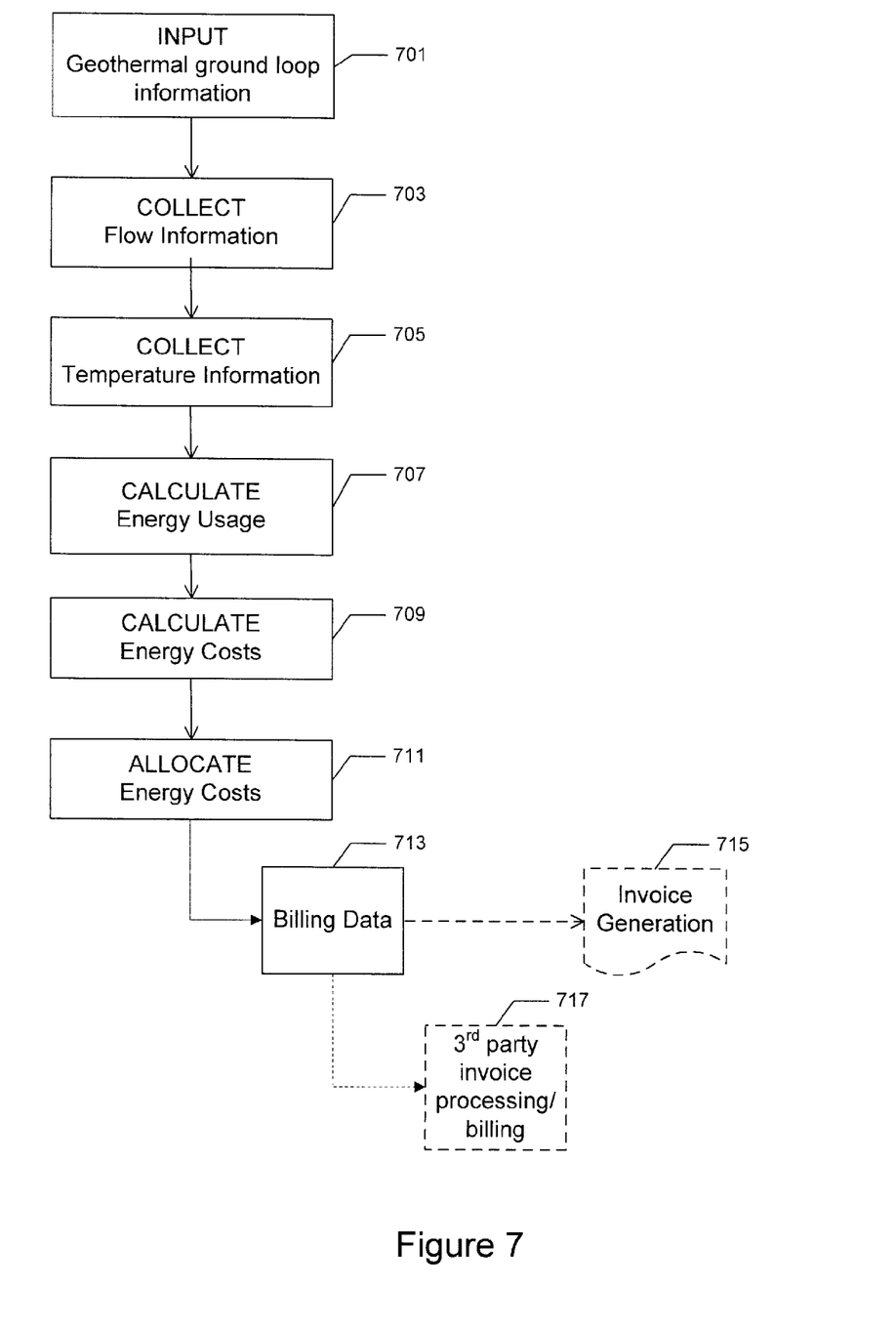
FIG. 7 is a flowchart of a billing method of the present invention.

With the growth of geothermal systems, the need for not only performance measurement, but billing and cost allocation, continues to grow. The modular geothermal measurement system of the present invention allows for a novel method of billing where energy costs are allocated across billed parties. For example, an apartment complex may elect to install a large geothermal system for providing heat to the various apartments in the complex. The modular geothermal measurement system of the present invention will allow the owner of the geothermal system to bill and generate revenues from the installed geothermal plant. FIG. 7 is a flowchart of a billing method of the present invention. In step 701, geothermal ground loop information such as loop geometries and thermal properties of a fluid are inputs to the method. In step 703, flow information such as flow rates in the loop are collected, and similarly, in step 705, temperature information is collected. Energy usage is calculated in step 707 by way of the temperature and flow rate information previously collected in steps 703 and 705. In step 709, energy costs are calculated such that energy costs may then be allocated in step 711, for example, across multiple apartment units or the like. Billing data is then generated in step 713 and optionally, invoices may be generated in step 715 or third party invoice processing or billing is performed in step 717. Other methods and techniques for billing, performance monitoring, invoicing, and the like may use the energy control points and the modular geothermal measurement system of the present invention.

It is, therefore, apparent that there has been provided, in accordance with the various objects of the present invention, a modular geothermal measurement system. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the present invention as defined by this specification, claims and the attached drawings.

What is claimed is:

1. A method of billing for geothermal energy comprising the steps of:
   collecting temperature information with a temperature sensor from a modular geothermal measurement system;
   collecting flow information from a modular geothermal measurement system;
   calculating, by at least one processor, amount of energy generated by at least one modular geothermal system using the collected temperature information and flow information;
   calculating, by the at least one processor, cost of the generated energy;

providing, by the at least one processor, energy control points comprising energy usage information, demand shifting information and control, system performance information, cost allocation information, billing information and system financing information;

using the provided energy control points to generate billing information for a beneficiary of the geothermal energy by the at least one processor, said beneficiary comprising owners, investors, system tenants, and service providers;

allocating, by the at least one processor, energy costs from the at least one modular geothermal system across billed parties, said billed parties comprising end users of the geothermal energy system; and generating, by the at least one processor, billing information for each billed party of the geothermal energy from the allocated geothermal energy costs.

2. The method of claim 1, further including the step of inputting geothermal ground loop information into a controller of the modular geothermal measurement system.

3. The method of claim 1, wherein said geothermal ground loop information comprises thermal properties of a fluid.

4. The method of claim 1, further including the step of converting said billing information into an invoice.

5. The method of claim 1, further including the step of providing said billing information to a third party.

* * * * *